(No Model.)
G. WESTERMAN, Jr., & W. T. MILLER.
COMPOSITION FOR TARGET BALLS.
No. 290,296. Patented Dec. 18, 1883.
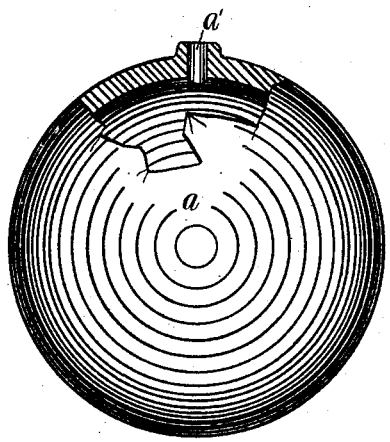
Witnesses:
Otto Hoddick.
J H Marling
Inventors.
George Westerman Jr
William T Miller
By Wm T Miller
Atty

United States Patent Office.

GEORGE WESTERMAN, JR., OF LOCKPORT, AND WILLIAM T. MILLER, OF BUFFALO, NEW YORK.

COMPOSITION FOR TARGET-BALLS.

SPECIFICATION forming part of Letters Patent No. 290,296, dated December 18, 1883.

Application filed September 27, 1883. (No model.)

*To all whom it may concern:*

Be it known that we, GEORGE WESTERMAN, Jr., residing at Lockport, in the county of Niagara and State of New York, and WILLIAM T. MILLER, residing at Buffalo, in the county of Erie and State of New York, have invented certain new and useful Improvements in Compositions for Target-Balls; and we do hereby declare the following to be a full, clear, and exact description of the invention, such as will enable others skilled in the art to which it appertains to make and use the same, reference being had to the accompanying drawing, and to letters or figures of reference marked thereon, which forms a part of this specification.

Our invention relates, more particularly, to the production of hollow target-balls; and to that end it consists, substantially, in a composition especially adapted for the purpose, composed of coal-tar commingled with coal-ashes or pulverized fire-clay.

The figure of the drawing represents, partially in section, a target-ball made from our improved composition.

In compounding such composition we take about sixty pounds of coal-tar and about twenty-five pounds of coal-ashes which have been finely sifted. These we place in a kettle or other suitable vessel and subject the same to heat until the tar is in a molten state, when the ashes can be thoroughly commingled with the tar by stirring. When the mixture has been properly prepared, as above indicated, it is poured into a series of hollow molds especially prepared for the purpose, and allowed to remain therein until a crust or shell has been formed around the interior of the mold of the thickness desired, when the molds are inverted and the soft interior of the mass therein is allowed to run off, thus forming a hollow globular shell, $a$, of uniform thickness with the orifice $a'$, as clearly shown in the figure of the drawing.

The proportions above named of the ingredients might be varied somewhat; but we have found in practice that they produce the best results.

The ingredients above named form, when combined, a peculiarly-desirable composition for the manufacture of these target-balls, both ingredients being comparatively inexpensive, more especially the coal-ashes, their cost being merely that of sifting and handling. The coal-tar, which forms the adhesive element of the composition, is additionally desirable, in that it presents to the target-ball a highly-glazed outer surface of an extremely dark color, which important feature in target-balls now in use is only approximately obtained by the addition of coloring-matter to the other ingredients employed in their manufacture. The tar, when cold, forms a brittle shell of the desired strength, and with the addition of the coal-ashes, which form the granular element of the composition, the ball is enabled to stand the effects of any ordinary temperature without losing its shape or its other desirable features.

We have found in practice that pulverized fire-clay will give very similar results to coal-ashes, when employed as an equivalent, in giving to the composition its granular feature; but the element of cost makes the coal-ashes decidedly preferable, other things being about equal.

We do not wish to be understood as limiting the use of our improved composition to the manufacture of target-balls, because, as hereinbefore stated, we have found it to be especially adapted for that purpose, as it is apparent that its uses might be numerous and varied in the manufacture of hollow molded articles.

We are aware that other compositions have been employed in the manufacture of target-balls of the kind herein shown and described, notably a composition of gypsum and rosin, which we herein disclaim; but What we do claim as of our invention is—

The composition for the manufacture of target-balls or other hollow articles, consisting, essentially, of coal-tar commingled by the aid of heat with coal-ashes or pulverized fire-clay, substantially as described.

In testimony whereof we have signed our names to this specification in the presence of two subscribing witnesses.

GEORGE WESTERMAN, JR.
    WILLIAM T. MILLER.

Witnesses:
 GEORGE WESTERMAN, Sr.,
 OTTO HODDICK.